United States Patent
Boulanger et al.

(10) Patent No.: US 12,506,422 B2
(45) Date of Patent: Dec. 23, 2025

(54) MOTOR BRAKING COIL FOR A POWER TOOL

(71) Applicant: MILWAUKEE ELECTRIC TOOL CORPORATION, Brookfield, WI (US)

(72) Inventors: Keith Boulanger, Kenosha, WI (US); Timothy R. Obermann, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 920 days.

(21) Appl. No.: 17/051,508

(22) PCT Filed: Apr. 24, 2020

(86) PCT No.: PCT/US2020/029774
§ 371 (c)(1),
(2) Date: Oct. 29, 2020

(87) PCT Pub. No.: WO2020/219847
PCT Pub. Date: Oct. 29, 2020

(65) Prior Publication Data
US 2021/0234481 A1     Jul. 29, 2021

Related U.S. Application Data

(60) Provisional application No. 62/838,788, filed on Apr. 25, 2019.

(51) Int. Cl.
*H02P 3/06*      (2006.01)
*B25F 5/00*      (2006.01)
(Continued)

(52) U.S. Cl.
CPC ............... *H02P 3/06* (2013.01); *H02K 3/12* (2013.01); *H02K 9/14* (2013.01); *H02K 11/33* (2016.01); *B25F 5/008* (2013.01); *H02K 1/16* (2013.01)

(58) Field of Classification Search
CPC .. H02P 3/06; H02K 11/33; H02K 3/12; H02K 9/14; H02K 1/16; B25F 5/008
(Continued)

(56) References Cited

U.S. PATENT DOCUMENTS

| | | |
|---|---|---|
| 1,895,379 A | 1/1933 | Dudick |
| 3,919,611 A | 11/1975 | Takahashi et al. |

(Continued)

FOREIGN PATENT DOCUMENTS

| | | |
|---|---|---|
| CN | 1907751 A | 2/2007 |
| CN | 201750384 U | 2/2011 |

(Continued)

OTHER PUBLICATIONS

International Search Report and Written Opinion for Application No. PCT/US2020/029774 dated Aug. 3, 2020 (10 pages).

(Continued)

*Primary Examiner* — Jorge L Carrasquillo
(74) *Attorney, Agent, or Firm* — Michael Best & Friedrich LLP (57) ABSTRACT

Method and power tool for braking a motor of the power tool. One embodiment provides a method for braking a motor of a power tool. The method includes operating, using a motor controller of the power tool, the motor in accordance with a user input. The method also includes detecting, using the motor controller, a braking event of the power tool and connecting, using a braking switch, a motor braking coil to the motor to brake the motor in response to detecting the braking event of the power tool. The method further includes cooling, using a component of the motor, the motor braking coil.

18 Claims, 10 Drawing Sheets

(51) Int. Cl.
*H02K 1/16* (2006.01)
*H02K 3/12* (2006.01)
*H02K 9/14* (2006.01)
*H02K 11/33* (2016.01)

(58) Field of Classification Search
USPC .......................................................... 318/375
See application file for complete search history.

(56) References Cited

U.S. PATENT DOCUMENTS

| | | | |
|---|---|---|---|
| 5,063,319 A | 11/1991 | Mason et al. | |
| 5,294,874 A | 3/1994 | Hessenberger et al. | |
| 5,572,916 A | 11/1996 | Takano | |
| 5,648,706 A | 7/1997 | Polk et al. | |
| 5,757,154 A * | 5/1998 | Peot | H02P 3/06 |
| | | | 318/248 |
| 6,037,729 A | 3/2000 | Woods et al. | |
| 6,084,366 A | 7/2000 | Koselke et al. | |
| 6,373,207 B1 | 4/2002 | Yablonovitch | |
| 6,653,806 B1 | 11/2003 | Ono | |
| 6,680,596 B1 | 1/2004 | DeCicco | |
| 6,819,022 B2 | 11/2004 | Yamamoto et al. | |
| 6,847,146 B2 | 1/2005 | Hessenberger et al. | |
| 7,023,159 B2 | 4/2006 | Gorti et al. | |
| 7,075,257 B2 | 7/2006 | Carrier et al. | |
| 7,112,751 B2 | 9/2006 | Turley | |
| 7,170,245 B2 * | 1/2007 | Youm | H02P 3/22 |
| | | | 318/362 |
| 7,248,008 B1 | 7/2007 | Cummins | |
| 7,400,106 B2 | 7/2008 | DeCicco et al. | |
| 7,487,844 B2 | 2/2009 | DeCicco et al. | |
| 7,511,396 B2 * | 3/2009 | Sesita | H02K 23/66 |
| | | | 310/179 |
| 7,537,065 B2 * | 5/2009 | Gallagher | H02K 23/08 |
| | | | 173/217 |
| 7,605,513 B2 | 10/2009 | Tanimoto et al. | |
| 7,708,085 B2 | 5/2010 | DeCicco et al. | |
| 7,861,796 B2 | 1/2011 | DeCicco et al. | |
| 7,926,585 B2 | 4/2011 | Pozgay et al. | |
| 8,322,456 B2 | 12/2012 | Pozgay et al. | |
| 8,561,717 B2 | 10/2013 | Pozgay et al. | |
| 8,766,569 B2 | 7/2014 | Suda et al. | |
| 8,985,241 B2 | 3/2015 | Pozgay et al. | |
| 9,475,180 B2 | 10/2016 | Eshleman et al. | |
| 9,515,581 B2 * | 12/2016 | Ogawa | H02P 6/085 |
| 9,893,674 B2 | 2/2018 | Ikai et al. | |
| 10,054,640 B2 * | 8/2018 | Saito | H02P 3/22 |
| 10,090,795 B2 | 10/2018 | Tateda | |
| 10,525,579 B2 | 1/2020 | Mashiko et al. | |
| 10,666,168 B2 | 5/2020 | Takeda | |
| 2002/0158593 A1 * | 10/2002 | Henderson | H02P 3/12 |
| | | | 318/375 |
| 2008/0135268 A1 | 6/2008 | Tadokoro et al. | |
| 2009/0224705 A1 | 9/2009 | Jobard et al. | |
| 2010/0090625 A1 * | 4/2010 | Nagashima | B60L 50/00 |
| | | | 318/376 |
| 2012/0074878 A1 | 3/2012 | Pant et al. | |
| 2012/0191250 A1 | 7/2012 | Iwata et al. | |
| 2013/0207491 A1 | 8/2013 | Hatfield et al. | |
| 2015/0137717 A1 | 5/2015 | Ishikawa et al. | |
| 2015/0326151 A1 | 11/2015 | Ogawa | |
| 2015/0330047 A1 | 11/2015 | Janssen et al. | |
| 2017/0016958 A1 * | 1/2017 | Saito | H02P 3/22 |
| 2017/0214335 A1 | 7/2017 | Basic et al. | |
| 2017/0264219 A1 * | 9/2017 | Takeda | H02P 6/17 |
| 2017/0288583 A1 | 10/2017 | Ma et al. | |
| 2017/0288584 A1 * | 10/2017 | Ma | H02P 6/085 |
| 2017/0302211 A1 | 10/2017 | Nakamoto et al. | |
| 2018/0254732 A1 | 9/2018 | Smolenaers | |
| 2019/0013762 A1 | 1/2019 | Yamaguchi et al. | |
| 2019/0084107 A1 | 3/2019 | Yabuguchi | |

FOREIGN PATENT DOCUMENTS

| | | |
|---|---|---|
| CN | 202435325 U | 9/2012 |
| CN | 103199772 A | 7/2013 |
| CN | 104816273 A | 8/2015 |
| DE | 3539841 A1 | 3/1987 |
| DE | 4022637 A1 | 1/1992 |
| DE | 4429962 A1 | 2/1996 |
| DE | 19542603 C2 | 3/1998 |
| DE | 19651298 C2 | 4/1999 |
| DE | 102011110929 A1 | 1/2013 |
| EP | 0551895 A1 | 7/1993 |
| EP | 0551896 A1 | 7/1993 |
| EP | 0551909 A1 | 7/1993 |
| EP | 0594115 A1 | 4/1994 |
| JP | S57192756 U | 12/1982 |
| JP | S6041825 Y2 | 12/1985 |
| JP | S6338700 Y2 | 10/1988 |
| JP | 2005253300 A | 9/2005 |
| JP | 2017213614 A | 12/2017 |
| KR | 101998043841 A | 9/1998 |
| KR | 20100108460 A | 10/2010 |
| KR | 20170096381 A | 8/2017 |
| WO | 2012055462 A2 | 5/2012 |
| WO | 2016031715 A1 | 3/2016 |
| WO | 2016085862 A1 | 6/2016 |

OTHER PUBLICATIONS

European Patent Office Extended Search Report for Application No. 20794981.9 dated Dec. 15, 2022 (9 pages).
Chinese Patent Office Action for Application No. 202080031324.5 dated Sep. 1, 2023 (25 pages including machine English translation).

* cited by examiner

MOTOR BRAKING COIL FOR A POWER TOOL

CROSS-REFERENCE TO RELATED APPLICATIONS

This application is a national phase filing under 35 U.S.C. § 371 of International Application No. PCT/US2020/029774, filed Apr. 24, 2020, which claims priority to U.S. Provisional Patent Application No. 62/838,788, filed on Apr. 25, 2019, the entire content of which is incorporated herein by reference.

RELATED APPLICATIONS

This application claims priority to U.S. Provisional Patent Application No. 62/838,788, filed on Apr. 25, 2019, the entire content of which is incorporated herein by reference.

FIELD

Embodiments described herein relate to a motor braking resistor coil used in the motor braking circuits of a power tool motor.

BACKGROUND

Figure 9A:
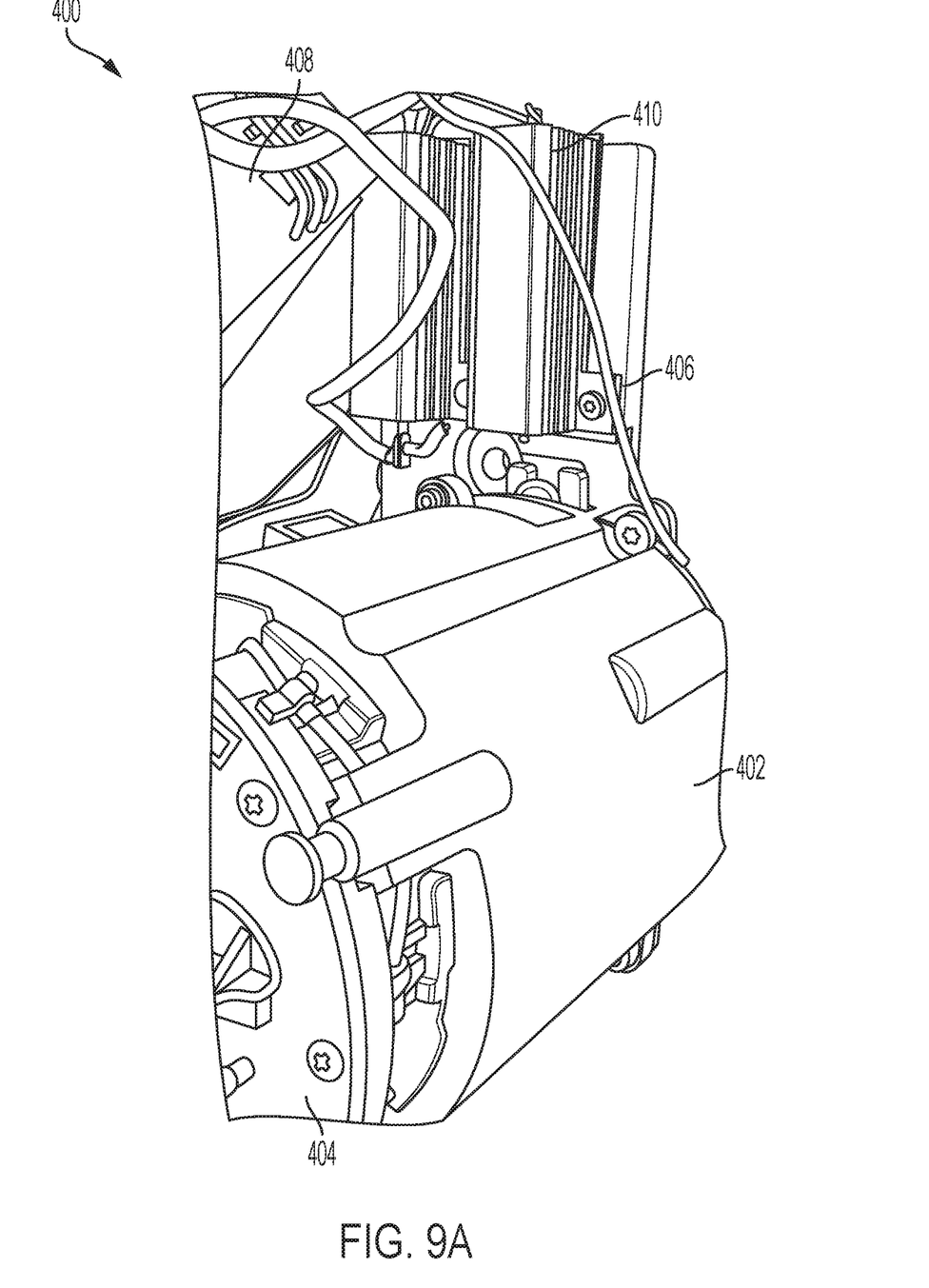
FIGS. 9A and 9B illustrate a motor assembly.
Figure 9B:
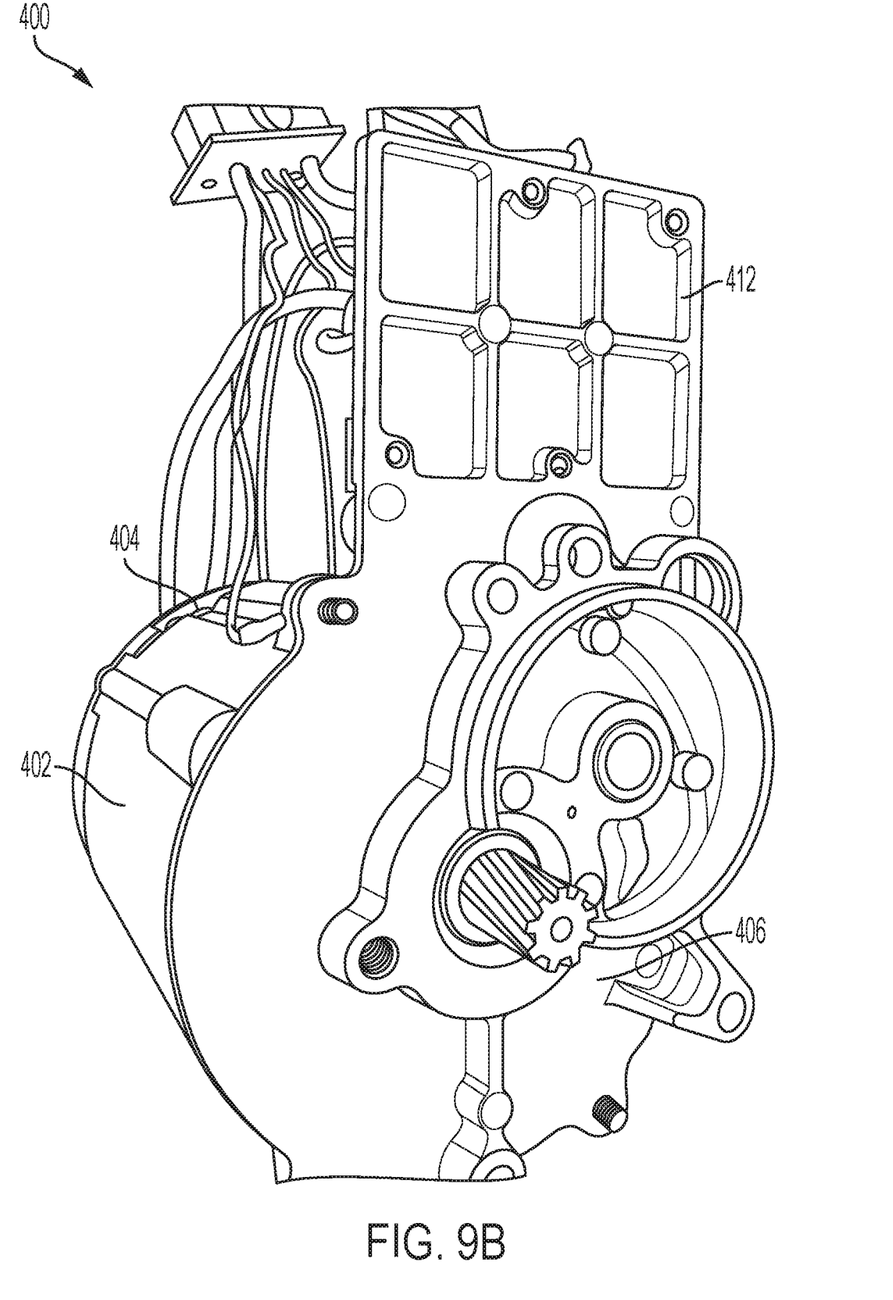

Some power tools include a braking resistance that is selectively connected in line with the motor to brake the motor. For example, FIGS. 9A and 9B illustrate an example of a motor assembly 400. The motor assembly 400 includes a motor housing 402 housing the motor, a motor circuit board 404, an end plate 406, motor braking resistors 408, and a heat sink 410. The end plate 406 is attached to an end of the motor and includes an extended portion 412 that extends radially outward beyond the outer radius of the motor housing 402. The heat sink 410 is provided on the extended portion 412 of the end plate 406. The motor braking resistors 408 are fixed to the top of the heat sink 410 such that the motor braking resistors 408 are in a heat-transfer relationship with the heat sink 410. When the motor is to be braked, the motor braking resistors 408 are coupled in series with the motor, which results in braking of the motor.

SUMMARY

The braking resistors 408 can be high cost, large resistance resistors that produce excess heat during braking, necessitating the heat sink 410 to dissipate the heat. Addition of the resistors 408 and heat sink 410 outside of the motor complicates the form factor of the power tool and the motor circuit. Additionally, the resistors 408 and the heat sink 410 add to the cost of manufacturing the power tool. Accordingly, at least some embodiments described herein provide improved techniques for braking the motor that simplifies the form factor and reduces costs of the power tool.

Power tools described herein include a housing, a motor provided in the housing, a power source providing operating power to the motor, and a motor drive circuit coupled between the power source and the motor to drive the motor. The motor drive circuit includes a plurality of switching elements controllable to drive the motor, a motor braking coil, and a braking switch configured to selectively connect the motor braking coil to the motor. The motor braking coil and the braking switch are connected between the power source and the plurality of switching elements. The power tools also include a motor controller connected to the motor drive circuit. The motor controller is configured to control the plurality of switching elements to operate the motor in accordance with a user input. The motor controller is also configured to detect a braking event of the power tool and connect, using the braking switch, the motor braking coil to the motor to brake the motor in response to detecting the braking event of the power tool.

In some constructions, the motor braking coil is wound around a stator of the motor. The stator of the motor absorbs the heat from the motor braking coil. In other constructions, the motor braking coil is wound around a component of the power tool, and the component absorbs a heat dissipated from the motor braking coil.

In some constructions, the motor includes stator windings wound around stator teeth of the stator. The motor braking coil is wound around one or more of the stator windings. In some constructions, the heat generated by the motor braking coil is dissipated by an airflow generated by a fan of the motor.

Methods described herein provide for braking a motor of a power tool. The methods include operating, using a motor controller of the power tool, the motor in accordance with a user input. The methods also include detecting, using the motor controller, a braking event of the power tool and connecting, using a braking switch, a motor braking coil to the motor to brake the motor in response to detecting the braking event of the power tool. The motor braking coil and the braking switch are connected between a power source and a plurality of switching elements. The methods further include cooling, using a component of the motor, the motor braking coil.

Power tools described herein include a housing, a motor provided in the housing, a power source providing operating power to the motor, a motor drive circuit, and a motor controller. The motor drive circuit is coupled between the power source and the motor to drive the motor. The motor drive circuit includes a plurality of switching elements controllable to drive the motor, a motor braking coil, and a braking switch connected in series with the motor braking coil. The braking switch is configured to selectively connect the motor braking coil to the motor. The motor braking coil and the braking switch are connected in parallel to the plurality of switching elements. The motor controller is connected to the motor drive circuit and is configured to control the plurality of switching elements to operate the motor in accordance with a user input, detect a braking event of the power tool, connect, using the braking switch, the motor braking coil to the motor to brake the motor in response to detecting the braking event of the power tool.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Other aspects of the invention will become apparent by consideration of the detailed description and accompanying drawings.

DETAILED DESCRIPTION

Figure 1:
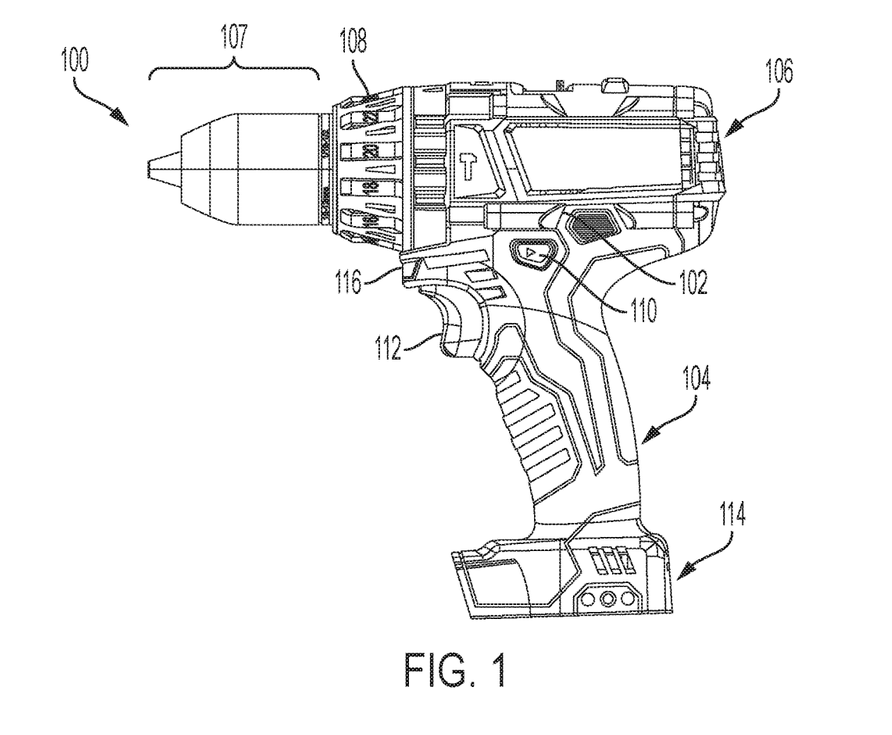
FIG. 1 illustrates a side view of a power tool in accordance with some embodiments.

FIG. 1 illustrates a power tool 100 incorporating a brushless direct current (DC) motor. In a brushless motor power tool, such as power tool 100, switching elements are selectively enabled and disabled by control signals from a controller to selectively apply power from a power source (e.g., battery pack) to drive a brushless motor. The power tool 100 is a brushless hammer drill having a housing 102 with a handle portion 104 and motor housing portion 106. The power tool 100 further includes an output driver 107 (illustrated as a chuck), torque setting dial 108, forward/reverse selector 110, trigger 112, battery interface 114, and light 116. Although FIG. 1 illustrates a hammer drill, in some embodiments, the motors described herein are incorporated into other types of power tools including drill-drivers, impact drivers, impact wrenches, angle grinders, circular saws, reciprocating saws, string trimmers, leaf blowers, vacuums, and the like.

Figure 2:
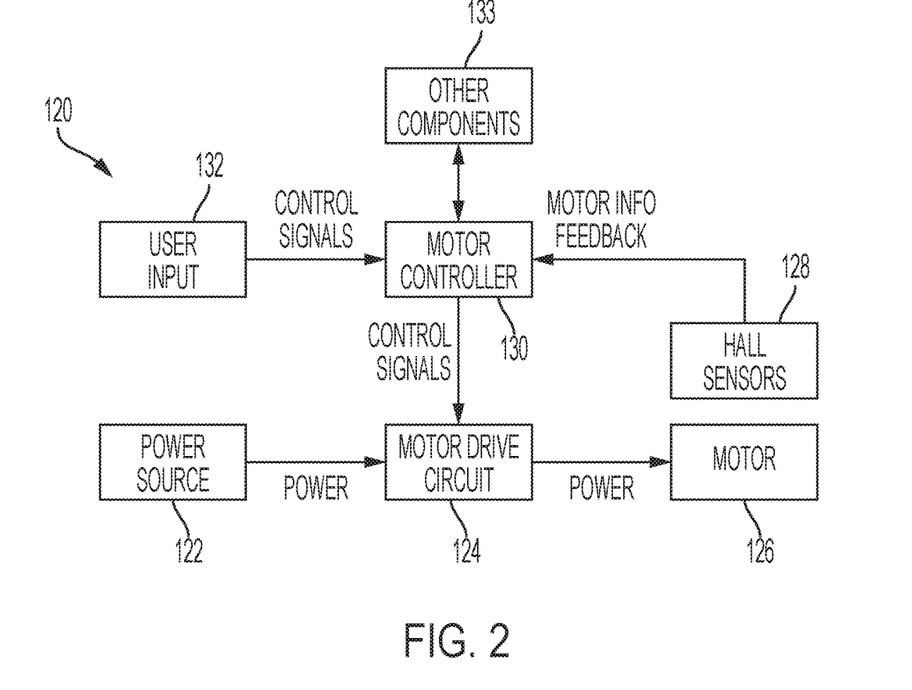
FIG. 2 illustrates a block diagram of the power tool of FIG. 1 in accordance with some embodiments.

FIG. 2 illustrates a simplified block diagram of the brushless power tool 100, which includes a power source 122, a motor drive circuit 124, a motor 126, Hall sensors 128, a motor controller 130, user input 132, and other components 133 (battery pack fuel gauge, work lights [e.g., LEDs], current/voltage sensors, etc.). The power source 122 provides DC power to the various components of the power tool 100 and may be a power tool battery pack that is rechargeable and uses, for instance, lithium ion cell technology. In some instances, the power source 122 may receive AC power (e.g., 120V/60 Hz) from a tool plug that is coupled to a standard wall outlet, and then filter, condition, and rectify the received power to output DC power. Each Hall sensor 128 outputs motor feedback information, such as an indication (e.g., a pulse) when a magnet of the rotor rotates across the face of that Hall sensor. Based on the motor feedback information from the Hall sensors 128, the motor controller 130 can determine the position, velocity, and acceleration of the rotor. The motor controller 130 also receives user controls from user input 132, such as by depressing the trigger 112 or shifting the forward/reverse selector 110. In response to the motor feedback information and user controls, the motor controller 130 transmits control signals to the motor drive circuit 124 to drive the motor 126, as explained in further detail with respect to FIG. 3. Although not shown, the motor controller 130 and other components of the power tool 100 are electrically coupled to the power source 122 such that the power source 122 provides power thereto.

Figure 3:
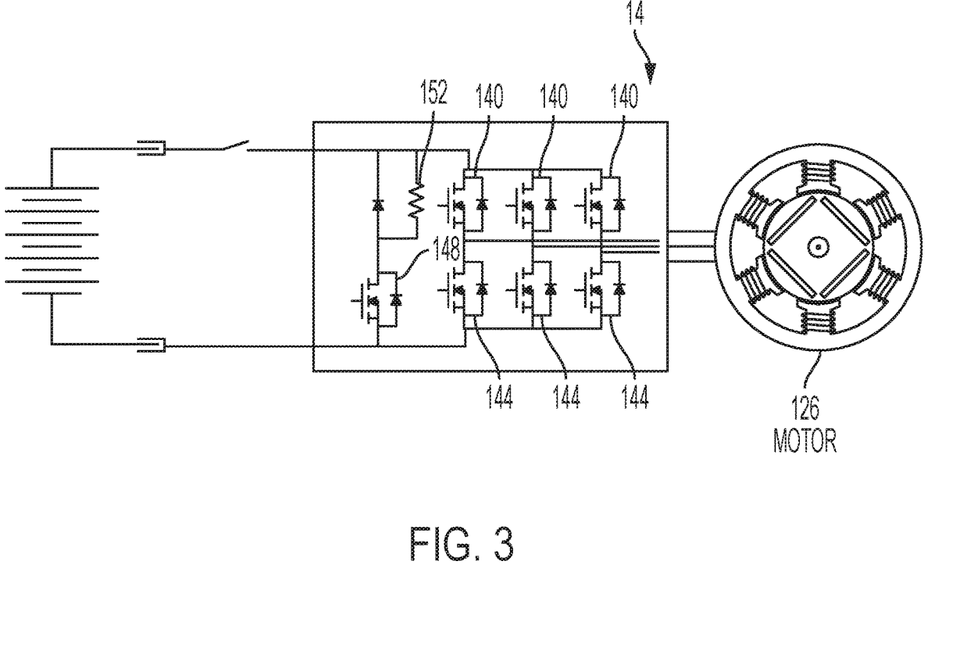
FIG. 3 illustrates a block diagram of a motor drive circuit of the power tool of FIG. 1 in accordance with some embodiments.

FIG. 3 illustrates a simplified block diagram of the motor drive circuit 124. The motor drive circuit 124 includes a plurality of high side power switching elements 140 (e.g., Field Effect Transistors [FETs]), a plurality of low side power switching elements 144 (e.g., FETs), a motor braking switch 148 (e.g., motor braking FET 148), and a braking resistor 152 (also referred to as a braking coil 152). The motor controller 130 provides the control signals to control the high side FETs 140 and the low side FETs 144 to drive the motor based on the motor feedback information and user controls, as noted above. For example, in response to detecting a pull of the trigger 112 and the input from forward/reverse selector 110, the motor controller 130 provides the control signals to selectively enable and disable the FETs 140 and 144 (e.g., sequentially, in pairs) resulting in power from the power source 122 to be selectively applied to stator coils of the motor 126 to cause rotation of a rotor. More particularly, to drive the motor 126, the motor controller 130 enables a first high side FET 140 and first low side FET 144 pair (e.g., by providing a voltage at a gate terminal of the FETs) for a first period of time. In response to determining that the rotor of the motor 126 has rotated based on a pulse from the Hall sensors 128, the motor controller 130 disables the first FET pair, and enables a second high side FET 140 and a second low side FET 144. In response to determining that the rotor of the motor 126 has rotated based on pulse(s) from the Hall sensors 128, the motor controller 130 disables the second FET pair, and enables a third high side FET 140 and a third low side FET 144. In response to determining that the rotor of the motor 126 has rotated based on further pulse(s) from the Hall sensors 128, the motor controller 130 disables the third FET pair and returns to enable the first high side FET 140 and the third low side FET 144. This sequence of cyclically enabling pairs of high side FET 140 and a low side FET 144 repeats to drive the motor 126. Further, in some embodiments, the control signals include pulse width modulated (PWM) signals having a duty cycle that is set in proportion to the amount of trigger pull of the trigger 112, to thereby control the speed or torque of the motor 126.

Figure 4:
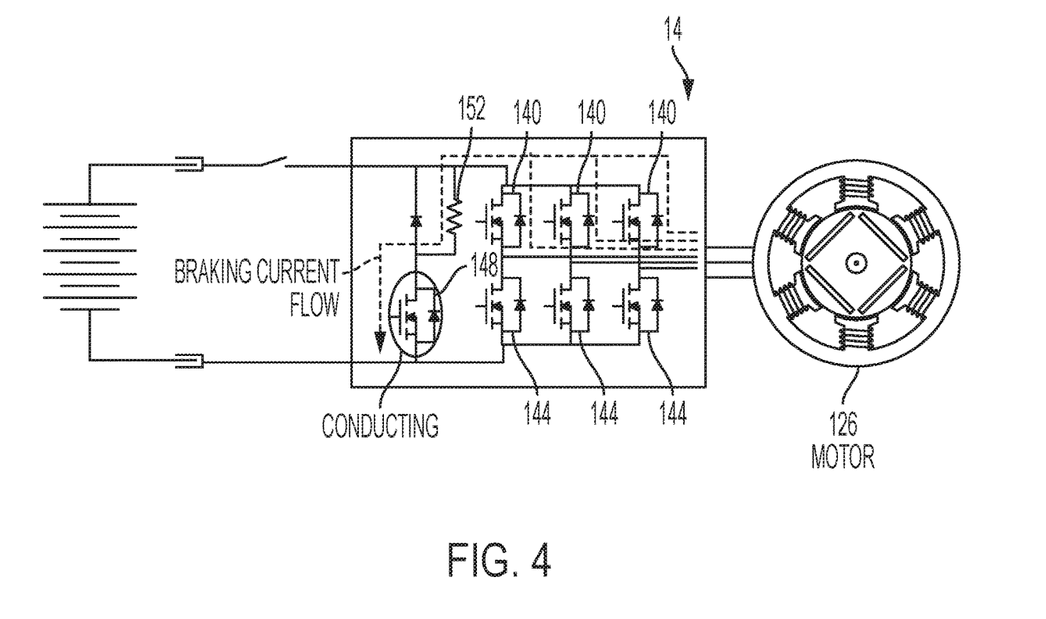
FIG. 4 illustrates a block diagram of the motor drive circuit of FIG. 3 during braking of a motor of the power tool of FIG. 1 in accordance with some embodiments.

To stop the motor 126, the motor controller 130 shorts the low side FETs 144 (i.e., enables the low side FETs 144 and disables the high side FETs 140) to allow the back EMF to flow through the motor coils of the motor 126. The back EMF provides a braking force on the magnets of the rotor. For power tools 100 in which it may be desirable to have a faster stopping of the motor 126 (e.g., saws, grinders, and the like), an additional resistance is used to brake the motor 126. As illustrated in FIG. 4, the motor controller 130 controls the braking FET 148 to close thereby connecting the braking resistance 152 to the current path of the motor 126. The braking resistance 152 absorbs the excess current and brings the motor 126 to a faster stop in comparison to a motor drive circuit 124 without the braking resistance 152. In the example illustrated, the high side FETs 140 are also closed to allow the back EMF to flow from the motor 126 through the high side FETs 140, the braking resistance 152 and to the ground or the negative terminal.

Figure 5A:
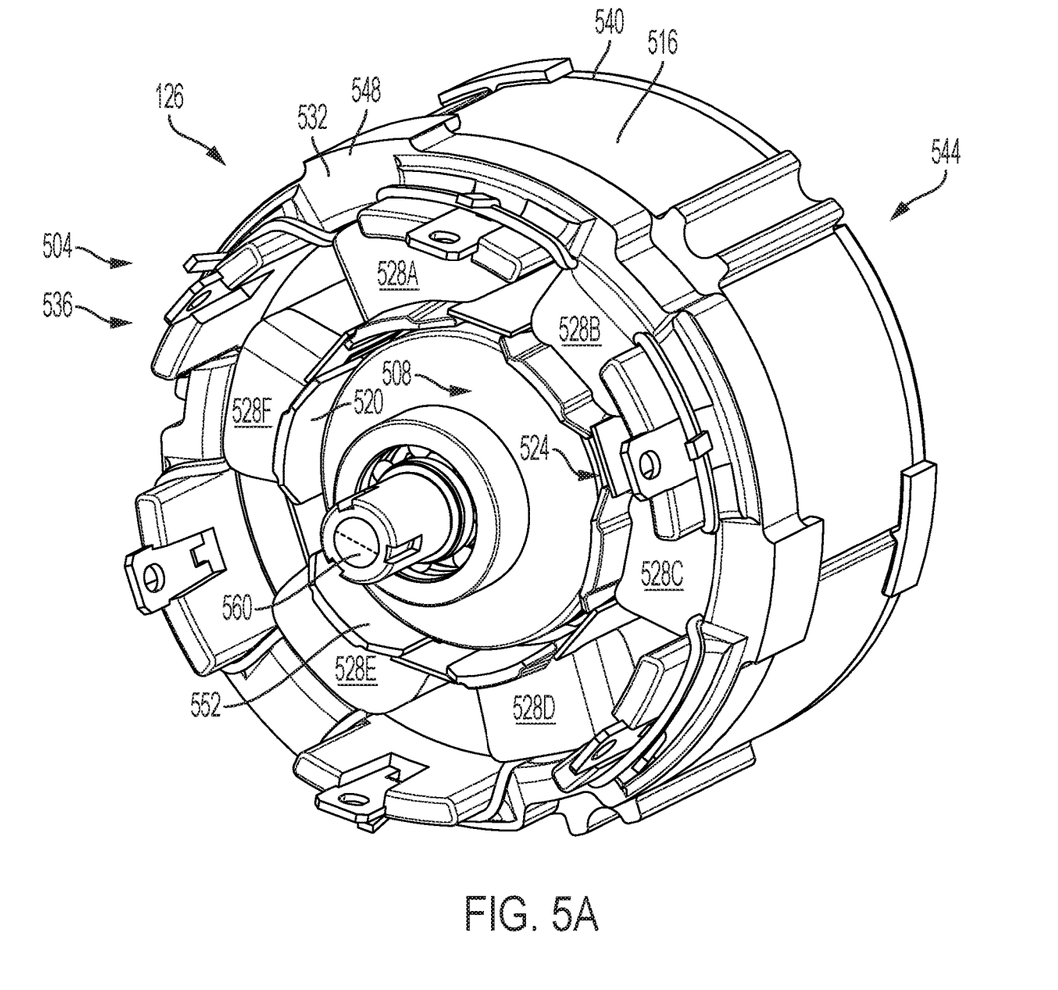
FIGS. 5A, 5B, and 5C illustrate a motor of the power tool of FIG. 1 in accordance with some embodiments.
Figure 5B:
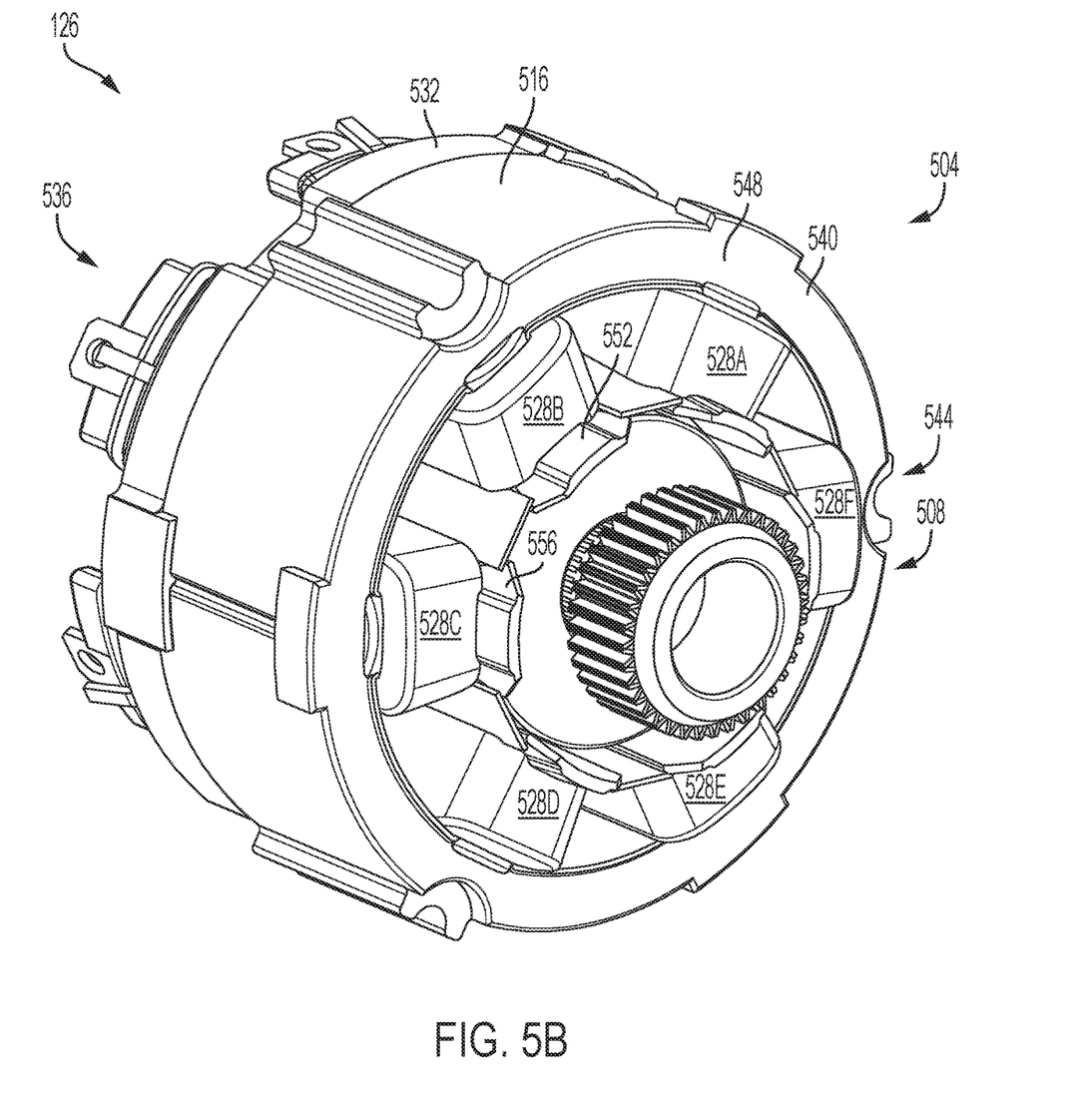
Figure 5C:
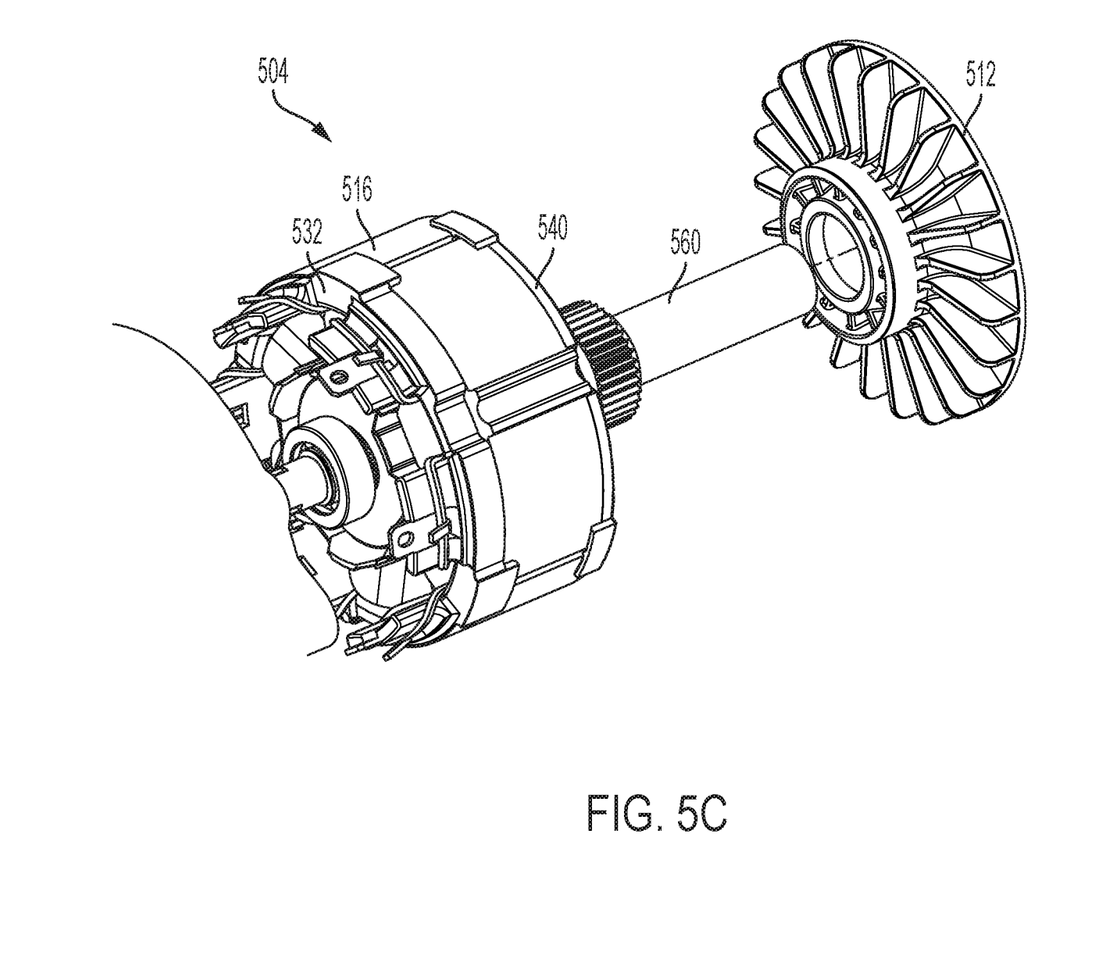

With reference to FIGS. 5A-C, the motor 126 includes a stator 504, a rotor 508 positioned at least partially within the stator 504, and a fan 512. The stator 504 includes a plurality of individual metal stator laminations stacked together to form a stator core 516. The stator 504 includes inwardly extending stator teeth 520 and slots 524 defined between each pair of adjacent stator teeth 520 when the laminations are stacked together. In the example illustrated, the stator 504 includes six stator teeth 520, defining six stator slots 524. The stator 504 further includes stator windings 528 at least partially positioned within the slots 524. In the example illustrated, the stator windings 528 includes six coils 528A-528F connected in a three phase configuration. The stator 504 includes a front end cap 532 adjacent a front end 536 of the stator core 516 and a rear end cap 540 adjacent a rear end 544. Each end cap 532, 540 includes rim portions 548 and end cap teeth 552 extending radially inward from the rim portions 548. The end cap teeth 552 include projections 556 that support the respective stator coil windings 528. The fan 512 is coupled to a rotor shaft 560 for co-rotation therewith. The fan 512 rotates with the rotor shaft 560 to generate a cooling airflow that is circulated through and around the motor 126. The cooling airflow absorbs the heat generated by the components of the motor 126 during operation.

Figure 6:
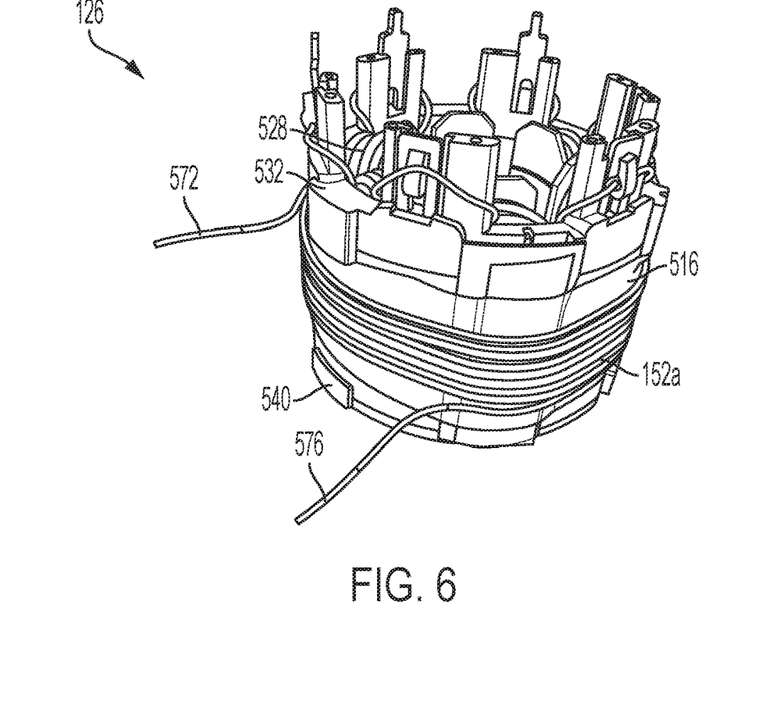
FIG. 6 illustrates a perspective view of a motor braking coil of the power tool of FIG. 1 in accordance with some embodiments.

FIG. 6 illustrates a motor braking resistance coil 152a, which is an example of the braking coil 152 described herein. In the example illustrated, the motor braking coil 152a is wound around the stator 504 of the motor 126. Particularly, the motor braking coil 152a is wound around the stator laminations between the front end cap 532 and the rear end cap 540. In other examples, the motor braking coil 152a may also be wound around another large object of the power tool 100. The motor braking coil 152 is, for example, a similar coil that is used for the stator windings 528. A coil of appropriate length may be cut from the material used for stator windings 528 to use as the motor braking coil 152a. The motor braking coil 152a is then wound around the stator 504. The ends 572 and 576 of the motor braking coil 152a are connected between the power source 122 and the braking FET 148 as shown in FIG. 3.

Figure 7:
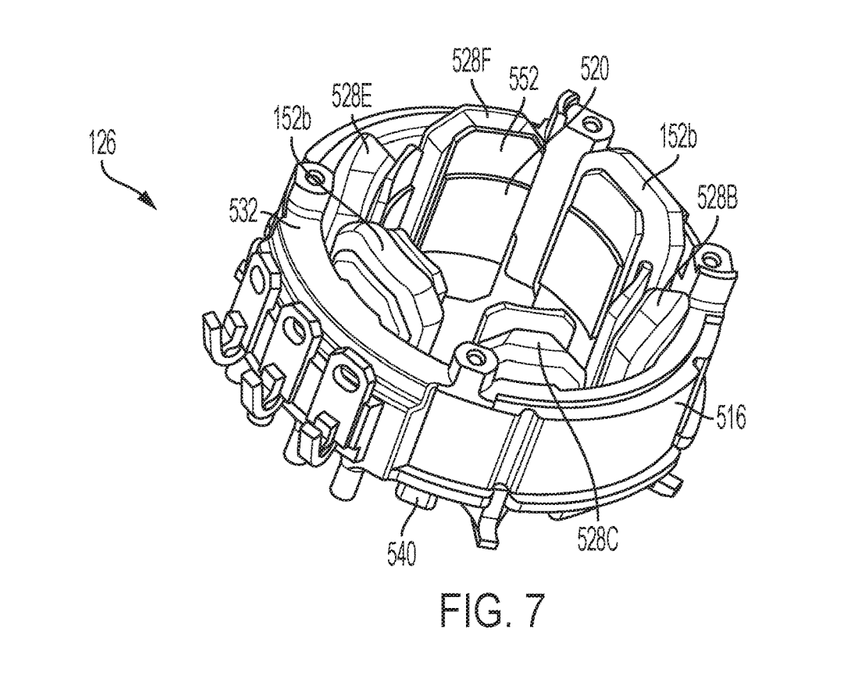
FIG. 7 illustrates a perspective view of a motor braking coil of the power tool of FIG. 1 in accordance with some embodiments.

FIG. 7 illustrates a motor braking resistance coil 152b, which is another example embodiment of the braking coil 152 described herein. In the example illustrated, the motor braking coil 152b is wound around two of the stator windings 528A and 528D. The stator windings 528 are wound around the stator core 516 with, for example, a continuous (i.e., single wire) precision winding process. The motor braking coil 152b is then wound around the one or more stator windings 528. A single coil is used as the motor braking coil 152b and is, for example, first wound around the stator winding 528A, carried over the front end cap 532 or the rear end cap 540 to the stator winding 528D, and wound around the stator winding 528D. The motor braking coil may be wound such that the ends 572 and 576 are provided on the same side of the motor 126. For example, the ends of the stator windings 528A-F are provided on one end of the motor 126 and the ends 572 and 576 of the motor braking coil 152b are provided on the opposite end of the motor 126. The ends 572 and 576 of the motor braking coil 152b are connected between the power source 122 and the braking FET 148 as shown in FIG. 3.

The motor braking coils 152a and 152b may be generically and collectively referred to as the braking coil 152. Compared to an over the shelf resistor, the motor braking coil 152 distributes the braking resistance over a larger area. The motor braking coil 152 therefore generates less heat than an over the shelf resistor. The heat due to the current flowing in the motor braking coil 152 is generated over a larger surface area allowing for easier dissipation. In the embodiment illustrated in FIG. 6, the stator 504 is made of several metal laminations stacked together. The stator 504 acts as a heat sink for the motor braking coil 152a to absorb the heat generated by the motor braking coil. In the embodiment illustrated in FIG. 7, the motor braking coil 152b is within the path of the airflow generated by the fan 512. The airflow generated by the fan absorbs the heat generated by the motor braking coil 152b.

Additionally, because the motor braking coil 152 is made from the same coil used for the stator windings 528 and no additional heat sink is required, the motor braking coil 152 results in reduced cost of the power tool 100.

Figure 8:
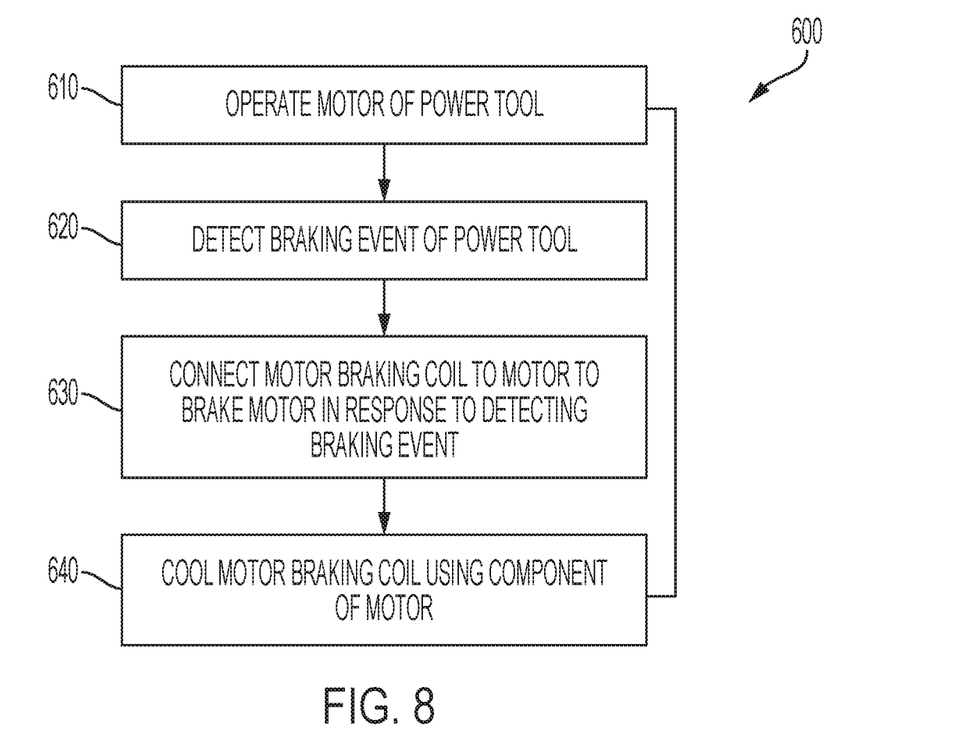
FIG. 8 is a flowchart of a method of braking a motor of the power tool of FIG. 1 in accordance with some embodiments.

FIG. 8 illustrates a flowchart of an example method 600 for braking the motor 126 of the power tool 100. In the example illustrated, the method 600 includes operating, using the motor controller 130, the motor 126 in accordance with the user input (at block 610). The motor controller 130 operates the motor according to control signals received from the user input 132 (e.g., from a trigger), as described above. For example, the motor controller 130 may perform an open loop or a closed loop speed control based on the user input 132 and the motor feedback received from the hall sensors 128.

The method 600 also includes detecting, using the motor controller 130, a braking event of the power tool 100 (at block 620). In some embodiments, the motor controller 130 detects a braking event when the user releases a trigger switch (user input 132) of the power tool 100. In other embodiments, the motor controller 130 may detect a braking event when the motor controller 130 determines, based on sensor signals, an abnormality in the operation of the motor 126 or the power tool 100 (e.g., excessive current, excessive temperature, or low voltage).

The method 600 includes connecting, using the motor controller 130, the motor braking coil 152 to the motor 126 to brake the motor 126 in response to detecting the braking event of the power tool 100 (at block 630). The motor controller 130 controls the braking FET 148 to turn ON in response to detecting the braking event. When the braking FET 148 is turned ON, the excess current in the motor 126 is drawn through the motor braking coil 152, as explained above with respect to FIGS. 3 and 4. As also explained above, the motor braking coil 152 may be wound around the stator laminations of the stator 504 (see FIG. 6) or around one or more of the stator windings 528 (see FIG. 7).

The method 600 further includes cooling the motor braking coil 152 using a component of the motor 126 (at block 640). As described above, the motor components provide cooling to the motor braking coil 152. In the example illustrated in FIG. 6, the heat produced in the motor braking coil 152a due to the braking current flowing through the motor braking coil 152a is reduced by the stator core 516. The metal laminations of the stator core 516 act as a heat sink to reduce the heat in the motor braking coil 152a. In the example illustrated in FIG. 7, the heat produced in the motor braking coil 152b due to the braking current flowing through the motor braking coil 152b is reduced by the cooling air flow generated by the fan 512. In some embodiments, the heat is reduced when the motor 126 and, thereby, the fan 512, is operated again after the motor 126 is braked (e.g., in response to a further trigger pull), rather than during the braking event.

Thus, various embodiments described herein provide for motor braking resistance coils for a motor braking circuit of a power tool motor. Various features and advantages are set forth in the following claims.

What is claimed is:

1. A power tool comprising:
   a housing;
   a brushless direct current motor provided in the housing, the brushless direct current motor including a stator, a rotor, and a stator lamination stack;
   a power source providing operating power to the motor;
   a motor drive circuit coupled between the power source and the motor to drive the motor, the motor drive circuit including:
     a plurality of switching elements controllable to drive the motor,
     a motor braking coil wound around a circumference of the stator lamination stack, wherein the stator lamination stack is configured to absorb heat generated by the motor braking coil, and
     a braking switch configured to selectively connect the motor braking coil to the motor, the motor braking coil and the braking switch electrically connected between a terminal of the power source and the plurality of switching elements and configured to form a current path between the power source and the plurality of switching elements; and
   a motor controller connected to the motor drive circuit and configured to:
     control the plurality of switching elements to operate the motor in accordance with a user input,
     detect a braking event of the power tool,
     connect, using the braking switch, the motor braking coil to the motor to brake the motor in response to detecting the braking event of the power tool.

2. The power tool of claim 1, wherein:
   the motor braking coil is wound around a stator of the motor; and
   the stator of the motor is configured to absorb the heat generated by the motor braking coil.

3. The power tool of claim 1, wherein:
   the motor braking coil is would around a component of the power tool; and
   the component of the power tool is configured to absorb the heat generated by the motor braking coil.

4. The power tool of claim 1, wherein the motor further includes:
   a stator having a plurality of stator teeth; and
   a plurality of stator windings wound around the plurality of stator teeth,
   wherein the motor braking coil is wound around one or more of the plurality of stator windings.

5. The power tool of claim 4, wherein:
   the motor further includes a fan attached for rotation with an output shaft of the motor; and
   the heat generated by the motor braking coil is dissipated by an airflow generated by the fan.

6. The power tool of claim 1, wherein the motor braking coil and the braking switch are connected in series.

7. The power tool of claim 6, wherein the motor braking coil and the braking switch are connected in parallel to the plurality of switching elements.

8. The power tool of claim 7, wherein the plurality of switching elements includes a plurality of pairs of high side switching elements and a plurality of low side switching elements such that motor phase coils of the motor are coupled to nodes between the high side switching elements and low side switching elements, and
   wherein the motor controller controls the motor braking switch and the plurality of high side switching elements to close when connecting the motor braking coil to the motor.

9. The power tool of claim 1, wherein the braking event includes a releasing of a trigger switch of the power tool.

10. A method for braking a brushless direct current motor of a power tool, the brushless direct current motor including a stator, a rotor, and a stator lamination stack, the method comprising:
    operating, using a motor controller of the power tool, the motor in accordance with a user input;
    detecting, using the motor controller, a braking event of the power tool;
    connecting, using a braking switch, a motor braking coil to the motor to brake the motor in response to detecting the braking event of the power tool, the motor braking coil and the braking switch electrically connected between a terminal of a power source and a plurality of switching elements and configured to form a current path between the power source and the plurality of switching elements; and
    cooling, using a component of the motor, the motor braking coil,
    wherein the motor braking coil is wound around a circumference of the stator lamination stack, and wherein the stator lamination stack is configured to absorb heat generated by the motor braking coil.

11. The method of claim 10, wherein:
    the component of the motor is a stator of the motor;
    the motor braking coil is wound around the stator of the motor; and
    the stator of the motor is configured to absorb the heat generated by the motor braking coil.

12. The method of claim 11, wherein the braking event includes a releasing of a trigger switch connected to the motor.

13. The method of claim 10, wherein:
    the component of the motor is one or more of a plurality of stator windings of the motor; and
    the motor braking coil is wound around one or more of the plurality of stator windings of the motor,
    wherein the heat generated by the motor braking coil is dissipated by an airflow generated by a fan attached for rotation with an output shaft of the motor.

14. The method of claim 10, wherein the motor braking coil and the braking switch are connected in series, and wherein the motor braking coil and the braking switch are connected in parallel to a plurality of switching elements that are controlled to operate the motor in accordance with the user input.

15. The method of claim 14, wherein the plurality of switching elements includes a plurality of pairs of high side switching elements and low side switching elements such that motor phase coils of the motor are coupled to nodes between the high side switching elements and low side switching elements.

16. The method of claim 15, further comprising, controlling, using the motor controller, the motor braking switch and the plurality of high side switching elements to turn on when connecting the motor braking coil to the motor.

17. A power tool comprising:
   a housing;
   a brushless direct current motor provided in the housing, the brushless direct current motor including a stator, a rotor, and a stator lamination stack;
   a power source providing operating power to the motor;
   a motor drive circuit coupled between the power source and the motor to drive the motor, the motor drive circuit including:
      a plurality of switching elements controllable to drive the motor,
      a motor braking coil wound around a circumference of the stator lamination stack, wherein the stator lamination stack is configured to absorb heat generated by the motor braking coil, and
      a braking switch connected in series with the motor braking coil, the braking switch configured to selectively connect the motor braking coil to the motor, the motor braking coil and the braking switch are electrically connected in parallel to the plurality of switching elements and configured to form a current path between a terminal of the power source and the plurality of switching elements; and
   a motor controller connected to the motor drive circuit and configured to:
      control the plurality of switching elements to operate the motor in accordance with a user input,
      detect a braking event of the power tool, and
      connect, using the braking switch, the motor braking coil to the motor to brake the motor in response to detecting the braking event of the power tool.

18. The power tool of claim 17, wherein the braking event includes a releasing of a trigger switch of the power tool, and wherein the plurality of switching elements includes a plurality of pairs of high side switching elements and a plurality of low side switching elements such that motor phase coils of the motor are coupled to nodes between the high side switching elements and low side switching elements.

* * * * *